G. W. J. MURPHY.
CURTAIN FASTENER.
APPLICATION FILED JULY 16, 1914.
1,170,092.
Patented Feb. 1, 1916.
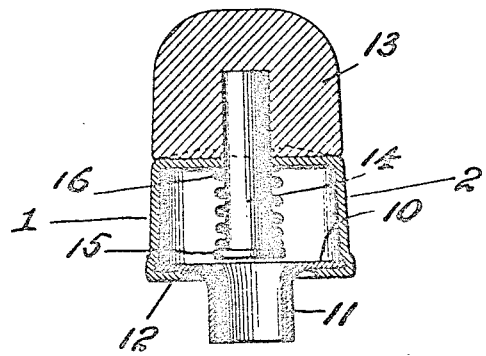
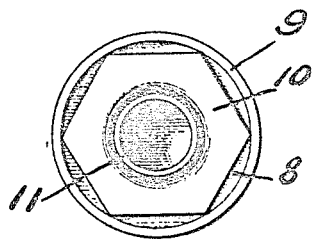
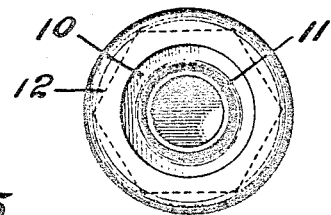
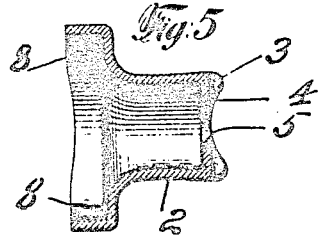
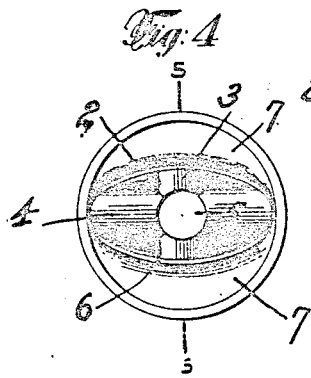
Witnesses:
John E. Prager
Lillian McGuire
Inventor
George W. J. Murphy
By his Attorneys
Davis & Davis

UNITED STATES PATENT OFFICE.

GEORGE W. J. MURPHY, OF MERRIMAC, MASSACHUSETTS, ASSIGNOR TO G. W. J. MURPHY COMPANY, OF MERRIMAC, MASSACHUSETTS, A CORPORATION OF MASSACHUSETTS.

CURTAIN-FASTENER.

1,170,692.  Specification of Letters Patent.  Patented Feb. 1, 1916.

Application filed July 16, 1914. Serial No. 851,246.

*To all whom it may concern:*

Be it known that I, GEORGE W. J. MURPHY, a subject of the King of Great Britain, and resident of Merrimac, in the county of Essex and State of Massachusetts, have invented certain new and useful Improvements in Curtain-Fasteners, of which the following is a specification.

One of the main objects of this invention is to provide a curtain fastener having a sheet metal base with a tubular rivet rigidly secured to the bottom thereof and serving as a fastening means by which the curtain fastener may be secured in position on a curtain or in any suitable position.

Another important object of the invention is to form the sheet metal base with a circular flange adapted to receive and clamp a non-circular flange on a tubular rivet, whereby said rivet will be rigidly held against rotation.

Another object of the invention is to so construct the sheet metal base that the tubular rivet or other fastening means will be held against longitudinal movement into the base, shoulders being formed in the base and adapted to be engaged by the flange of the tubular rivet to hold said rivet against longitudinal movement.

In the drawing, Figure 1 is a longitudinal sectional view of the fastener complete; Fig. 2 a bottom plan view before the retaining flange is turned over the head of the rivet; Fig. 3 a similar view showing the retaining flange crimped or turned over the flange of the rivet; Fig. 4 a plan view of the base; Fig. 5 a sectional view thereof on line 5—5 of Fig. 4; and Fig. 6 a side elevation of the tubular rivet.

Referring to the various parts by numerals, 1 designates the sheet metal base of the fastener which is preferably stamped to proper form and consists of the main body part 2 which is substantially elliptical in transverse section, as shown clearly in Fig. 4. This body part is formed at its upper end with the broad semi-circular intersecting grooves 3 and 4, groove 4 extending longitudinally of the body part of the fastener and groove 3 extending transversely thereof. Through the upper wall of this body part is formed an aperture 5 which is smaller in diameter than the grooves whereby radiating ridges 6 are formed at the intersections of the grooves. The upper edge of the base slopes from the outer ends of the radiating ridges to the bottom of the grooves whereby the turn buttons to be hereinafter described will not readily remain at rest at a point intermediate the grooves but will automatically move down said ridge or edge to the bottom of the grooves. The advantages of this construction of base is well known and forms a very desirable fastener for use on automobile curtains.

The shell of the base is enlarged at the bottom of the body part into the circular base flange 7. This base flange forms a broad interior shoulder 8. At the outer edges of the base flange the depending or longitudinally extending annular flange 9 is formed, as shown clearly in Figs. 2 and 5. Fitting within the base flange and bearing against the shoulder 8 is the hexagonal head or flange 10 of a tubular rivet 11, as shown clearly in Fig. 2. To rigidly and permanently secure the rivet to the base, the annular flange 9 is turned inwardly over the flange or head 10 of the rivet 11 to form the annular retaining or clamping flange 12, as shown clearly in Figs. 1 and 3. By this means the tubular rivet is very rigidly secured in position and is held against rotation by reason of the non-circular base. It is manifest that this rivet base or head may be of any non-circular form, it being desirable to hold the said rivet rigidly in position and to prevent the rotation thereof. It is desirable that the curtain fastener shall not rotate on its securing means and for that reason the rivet head is preferably made non-circular.

The curtain fastener is provided with a turn button 13 carrying a stem 14 which projects through the aperture in the base. This stem is formed with a head 15 between which and the top of the base is located a coil spring 16, said coil holding the turn button 13 in the grooves on the top of the base. The lower surface of the turn button is substantially semi-cylindrical or convex to fit the grooves in the top of the base.

A curtain fastener constructed in accordance with this invention may be readily manufactured at small cost. By reason of the tubular rivet the fastener may be very readily connected to the curtain or other suitable supporting means. It is manifest that the fastening means will be very rigidly and strongly connected to the base of the fastener and that it is not likely to become detached or disconnected.

What I claim is:

A curtain fastener comprising a sheet metal base formed with a substantially elliptical body part, a circular base flange at its lower end, said flange being perpendicular to the longitudinal line of the fastener and substantially equal in diameter to the longer diameter of the elliptical body part and forming shoulders at opposite sides of the shorter diameter of the elliptical body part, a fastening device formed with a thin flat head fitting against the under side of the shoulders formed by the flange of the base, said shoulders holding the fastening device against inward movement, and a retaining flange formed around the margin of the circular base and extending inwardly over the flat head of the fastening device, said flange holding said head against the aforesaid shoulders and preventing its rotation.

In testimony whereof I hereunto affix my signature in the presence of two witnesses.

GEORGE W. J. MURPHY.

Witnesses:
FREDERICK C. GRANT,
A. RAYMOND WATERHOUSE.

Copies of this patent may be obtained for five cents each, by addressing the "Commissioner of Patents. Washington, D. C."